United States Patent
Maeshima

(10) Patent No.: US 7,583,494 B2
(45) Date of Patent: Sep. 1, 2009

(54) ELECTRICAL DOUBLE LAYER CAPACITOR AND PRODUCTION METHOD THEREFOR

(75) Inventor: Hiroyuki Maeshima, Hyogo (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 11/595,883

(22) Filed: Nov. 13, 2006

(65) Prior Publication Data

US 2007/0058327 A1    Mar. 15, 2007

Related U.S. Application Data

(63) Continuation-in-part of application No. PCT/JP2005/007859, filed on Apr. 26, 2005.

(30) Foreign Application Priority Data

May 13, 2004    (JP)    ............................. 2004-143449

(51) Int. Cl.
    *H01G 9/00*    (2006.01)
(52) U.S. Cl. ....................... 361/502; 361/503
(58) Field of Classification Search ................. 361/502, 361/503
    See application file for complete search history.

(56) References Cited

U.S. PATENT DOCUMENTS

| 6,064,562 | A | 5/2000 | Okamura |
| 6,262,879 | B1 * | 7/2001 | Nitta et al. ................. 361/517 |
| 2004/0245120 | A1 | 12/2004 | Maeshima et al. |

FOREIGN PATENT DOCUMENTS

| JP | 9-223645 A | 8/1997 |
| JP | 11-67608 A | 3/1999 |
| JP | 2000-294459 A | 10/2000 |
| JP | 3405040 | 3/2003 |
| JP | 2004-71814 A | 3/2004 |

* cited by examiner

*Primary Examiner*—Eric Thomas
(74) *Attorney, Agent, or Firm*—McDermott Will & Emery LLP

(57) ABSTRACT

The electrical double layer capacitor includes a case, an electrolyte stored in the case, a positive electrode, a negative electrode, and a molecular sieve, wherein the electrolyte contains cation and anion, and the molecular sieve suppresses either one or both of the adsorption of cation onto a surface of the positive electrode and the adsorption of anion onto a surface of the negative electrode. Due to this configuration, it is possible to provide an electrical double layer capacitor having high withstand voltage and long life.

20 Claims, 11 Drawing Sheets

TEA⁺

AMN⁺

EMI⁺

TMIL⁺

TMI⁺ ical double layer capacitor depends upon electrolyte. Conventionally, in order to obtain higher withstand voltage, trials and errors have been repeated. For example, many supposed solutes and solvents are combined to synthesize electrolyte, and the withstand voltage of the synthesized electrolyte is measured. When the result of withstand voltage measurement satisfies the intended withstand voltage, it is used as electrolyte for electrical double layer capacitors. In this way, the withstand voltage of capacitors is improved.

ELECTRICAL DOUBLE LAYER CAPACITOR AND PRODUCTION METHOD THEREFOR

RELATED APPLICATIONS

This application is a continuation-in-part of International Application No. PCT/JP2005/007859, filed on Apr. 26, 2005, which in turn claims the benefit of Japanese Application No. 2004-143449, filed on May 13, 2004, the disclosures of which Applications are incorporated by reference herein.

TECHNICAL FIELD

The present invention relates to an electrical double layer capacitor and its manufacturing method

BACKGROUND ART

An electrical double layer capacitor is required to be high in withstand voltage. The withstand voltage of an electrical double layer capacitor depends upon electrolyte. Conventionally, in order to obtain higher withstand voltage, trials and errors have been repeated. For example, many supposed solutes and solvents are combined to synthesize electrolyte, and the withstand voltage of the synthesized electrolyte is measured. When the result of withstand voltage measurement satisfies the intended withstand voltage, it is used as electrolyte for electrical double layer capacitors. In this way, the withstand voltage of capacitors is improved.

Also, for effectively utilizing such withstand voltage improvement of electrolyte, the capacitance is adjusted with respect to positive electrode and negative electrode to manufacture electrical double layer capacitors.

Such a conventional electrical double layer capacitor is disclosed for example in Japanese Patent No. 3405040 and Japanese Unexamined Publication No. 2004-71814.

However, electrolyte has an inherent withstand voltage. And, an electrical double layer capacitor cannot be used with a voltage higher than the inherent withstand voltage of the electrolyte used for it. This is because the deterioration of electrical characteristics such as reduction of capacitance and increase of internal resistance are accelerated, and also, the case becomes easier to break down due to electrolyte reaction accompanied by increase in the amount of gas generated. Also, it is possible to make the most of inherent withstand voltage of the electrolyte by adjusting the electrode capacitance of positive electrode and negative electrode, but even in that case, the capacitor cannot be used with a voltage higher than the inherent voltage of the electrolyte.

SUMMARY OF THE INVENTION

An electrical double layer capacitor of the present invention includes a case, an electrolyte stored in the case, a positive electrode, a negative electrode, and a molecular sieve, the electrolyte contains a cation and an anion, and the molecular sieve suppresses either one or both of adsorption of the cation onto a surface of the positive electrode and adsorption of the anion onto a surface of the negative electrode. In this configuration, it is possible to provide the electrical double layer capacitor having high withstand voltage and long life.

REFERENCE MARKS IN THE DRAWINGS

1 Case
2 Element
3 Sealing rubber
4 Separator
5, 6 Collector
7A, 7B Active carbon
8 Electrolyte
9 Cation
10 Anion
12 Solvent
14 Associated complex
15 Negative electrode
16 Positive electrode
19A, 19B Active carbon pore
21A, 21B Coat
23A, 23B Coat pore

DETAILED DESCRIPTION OF PREFERRED EMBODIMENTS

Preferred Embodiment

The preferred embodiment of the present invention will be described in the following with reference to the drawings.

Figure 1:
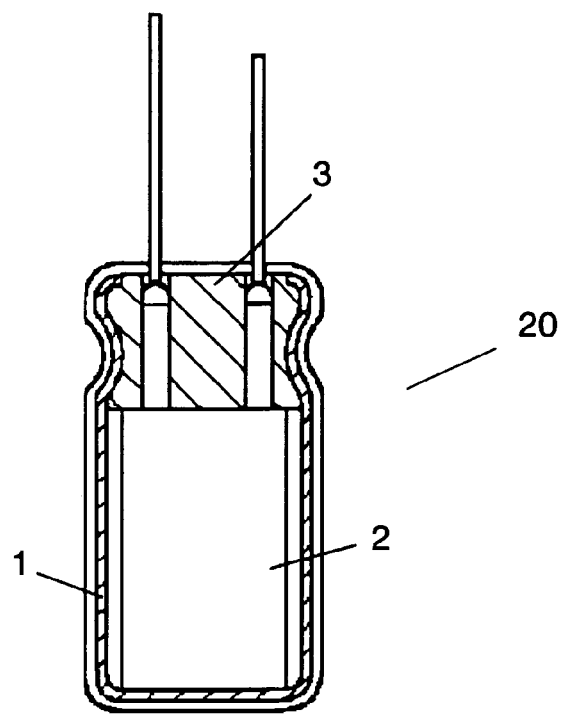
FIG. 1 is a sectional view of an electrical double layer capacitor in the preferred embodiment of the present invention.
Figure 2:
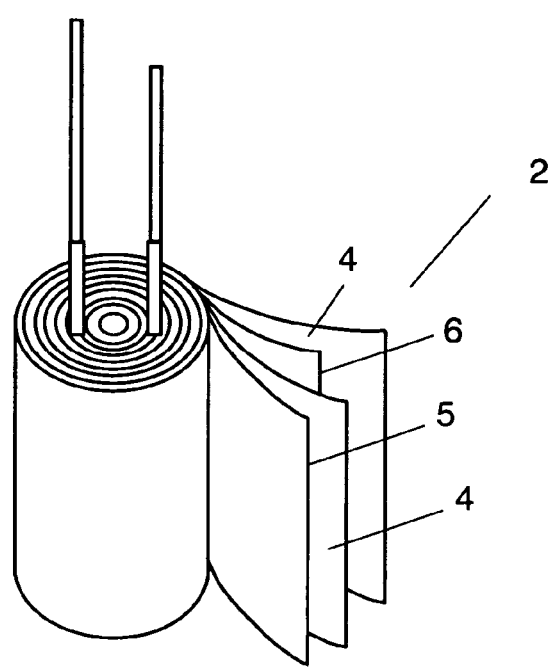
FIG. 2 is a perspective view of an essential portion of an electrical double layer capacitor in the preferred embodiment of the present invention.
Figure 3:
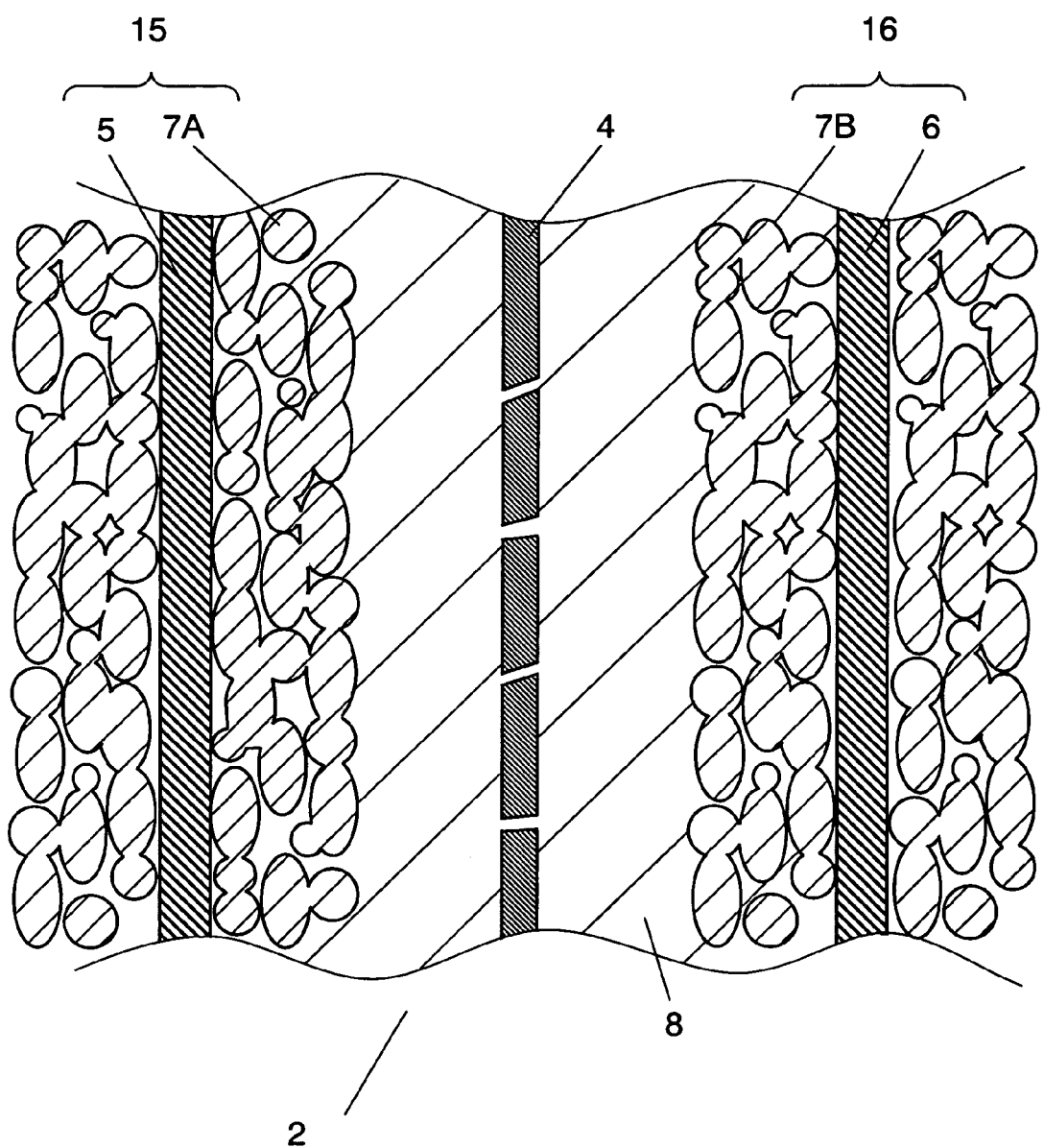
FIG. 3 is an enlarged sectional view of an essential portion of an electrical double layer capacitor in the preferred embodiment of the present invention.
Figure 10:
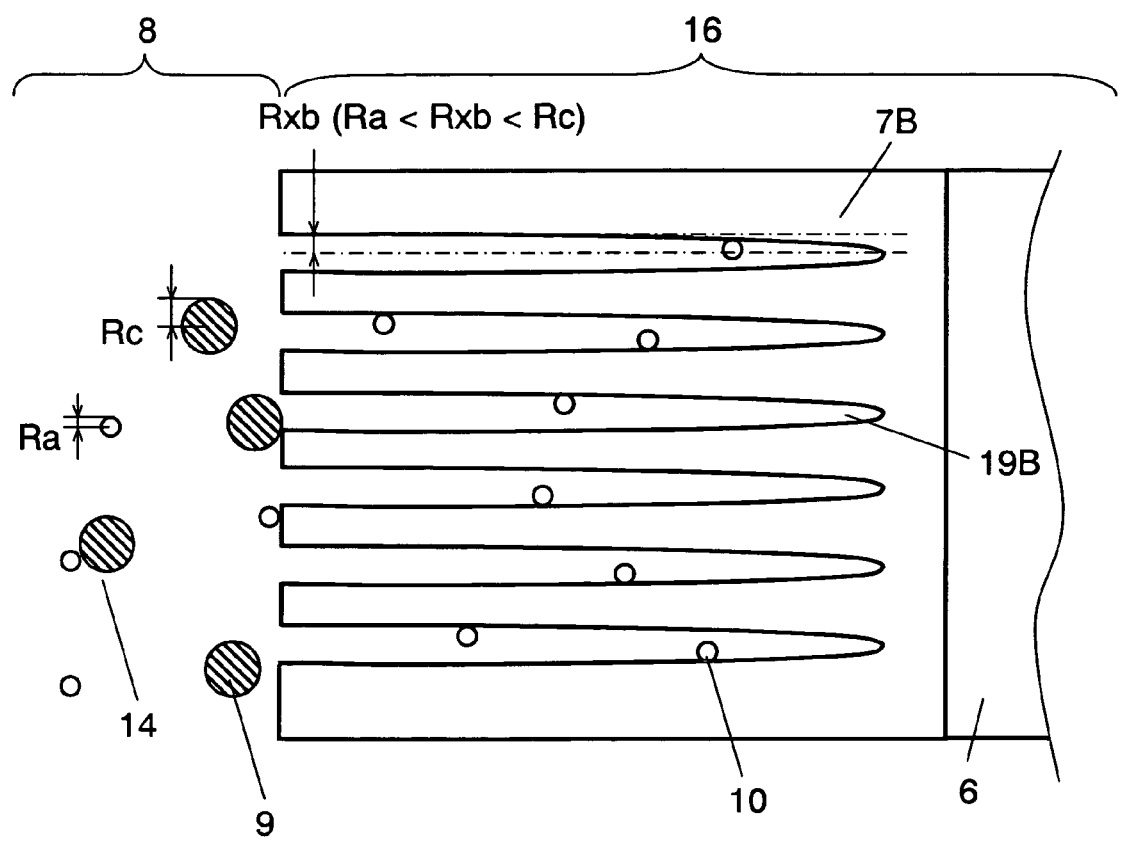
FIG. 10 is a schematic diagram of an electrical double layer capacitor in the preferred embodiment of the present invention.
Figure 11:
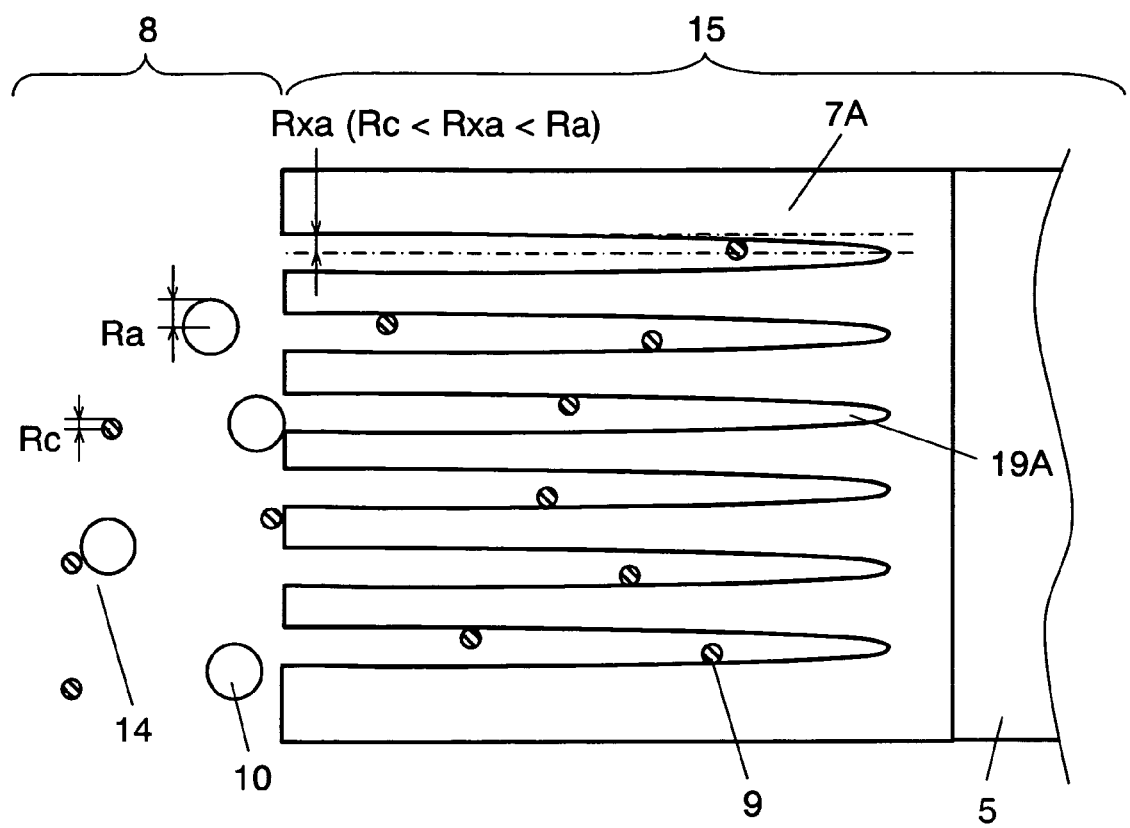
FIG. 11 is a schematic diagram of an electrical double layer capacitor in the preferred embodiment of the present invention.

FIG. 1 to FIG. 3 show an electrical double layer capacitor of the preferred embodiment. Electrical double layer capacitor 20 is configured in that element 2 is sealed in outer case 1 by sealing rubber 3. Element 2 is formed of strip-shaped separators 4 and strip-shaped collectors 5, 6. Collectors 5, 6 are spirally wound at surfaces and backs of separators 4. Active carbons 7A, 7B are respectively provided on surfaces of collectors 5, 6, the surfaces are facing to separator 4. Active carbon 7A is, as shown in FIG. 11 mentioned later, has active carbon pore 19A (hereinafter referred to as pore 19A) which acts as a second molecular sieve. Active carbon 7B is, as shown in FIG. 10 mentioned later, has active carbon pore 19B (hereinafter referred to as pore 19B) which acts as a first molecular sieve. And, electrolyte 8 filled in outer case 1 exists between collector 5 and collector 6. Negative electrode 15 as a minus side electrode is formed by collector 5 and active carbon 7A. Also, positive electrode 16 as a plus side electrode is formed by collector 6 and active carbon 7B.

Aluminum is used for outer case 1 and collectors 5, 6 from the viewpoint of weight and conductivity. It is preferable to use materials such as stainless steel or nickel-plated iron for outer case 1 taking the strength into consideration. It is also preferable to use nickel or the like for collectors 5, 6. Sealing rubber 3 is made from a material not corroded by electrolyte such as ethylene-propylene rubber. Also, separator 4 is formed from non-woven fabric or porous film such as cellulose, polyethylene or polypropylene.

Electrolyte 8 is formed of cation 9 and anion 10 as solute, solvent 12, and other additives (not shown). However, a solution not containing solvent 12 and the additives can be used for electrolyte 8. For example, an salt formed of 1-ethyl-3-methyl-imidazolium and tetrafluoroborate is dissolved salt liquefied at room temperature (25 degree), so solvent is not always needed.

An inherent withstand voltage of electrolyte 8 can be defined as potential window from a current-voltage curve obtained by the electrochemical measuring method or the like. The potential window is defined a size of voltage zone where the current is lower than a specific level on the current-voltage curve. Also, the electro-chemical measuring method is, for example, cyclic voltammetry or linear sweep voltammetry using Pt electrode or glassy carbon electrode as working electrode. Also, the withstand voltage of electrolyte 8 can be defined as the upper limit of voltage at which capacitance decreasing speed or internal resistance increasing speed with voltage applied is less than a specific value in a conventional electrical double layer capacitor having no molecular sieve. The potential window is the total value of oxidation potential and reduction potential, and in the voltage range inside the potential window, the oxidation-reduction reaction of electrolyte hardly takes place. Therefore, electrical double layer capacitor 20 using electrolyte 8 with greater potential window can be used with higher voltage, suppressing the capacitance decreasing speed or the internal resistance increasing speed.

Figure 7:
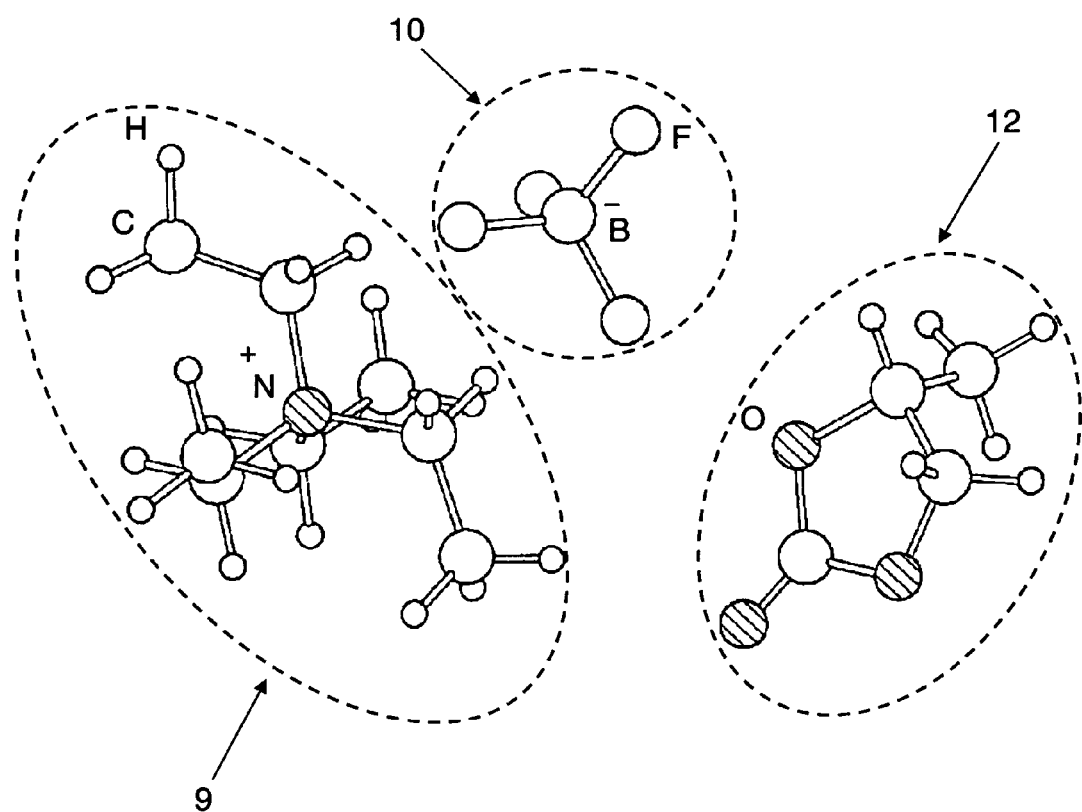
FIG. 7 is a schematic diagram of an electrolyte used for an electrical double layer capacitor in the preferred embodiment of the present invention.
Figure 8:
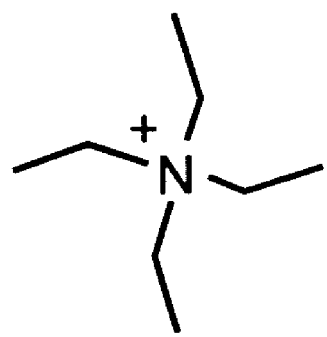
FIG. 8 is a chemical structure diagram of an electrolyte used for an electrical double layer capacitor in the preferred embodiment of the present invention.
Figure 8:
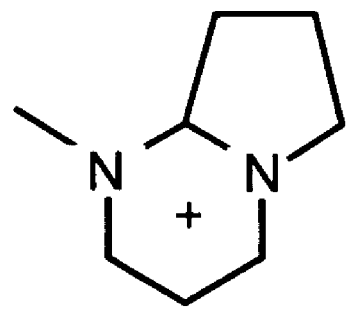
Figure 8:
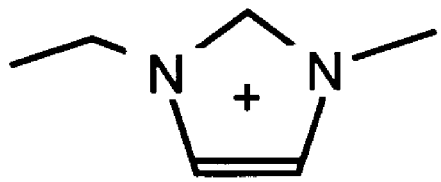
Figure 8:
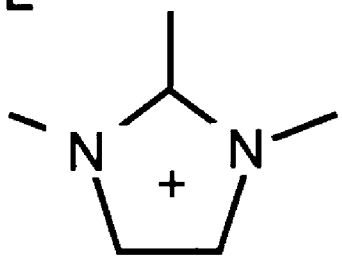
Figure 8:
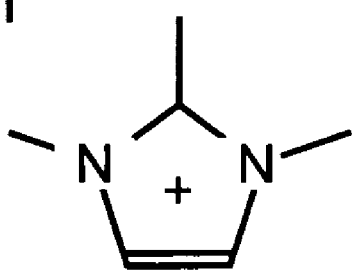

For example, the withstand voltage of electrolyte 8 is measured by the above method. Electrolyte 8 used for measurement includes tetrafluoroborate ($BF_4^-$) as anion 10. Also, there are five kinds of electrolyte 8 including any one of tetra-ethyl-ammonium ($TEA^+$), 1-ethyl-3-methyl-imidazolium ($EMI^+$), 1,2,3-trimethyl-imidazolium ($TMI^+$), 5-aza-1-azonia-5-methyl-bicyclo[4,3,0]-nonane ($AMN^+$), 1,2,3,4-tetra-methyl-imidazolium ($TMIL^+$), as cation 9. Also, glassy carbon is used for working electrode, platinum for counter electrode, and $Ag^+/Ag$ for reference electrode. Further, the current-voltage curve is obtained by cyclic voltammetry executing voltage scanning at 10 mV/sec. From the obtained current-voltage curve, reduction potential (Ered), oxidation potential (Eox) and potential window (Ew) are decided by the voltage value of which the current value is 1 $mA/cm^2$. The reduction potential (Ered), the oxidation potential (Eox) and the potential window (Ew) are as shown in Table 1. Also, the schematic diagram of the chemical structure of electrolyte 8 including cation 9 and anion 10 used in these measurements is shown in FIG. 7.

TABLE 1

Oxidation-reduction potentials measured by cyclic voltammetry

| Chemical species | Reduction potential Ered | (Solvent: propylene carbonate) Oxidation potential Eox | Potential window Ew |
|---|---|---|---|
| | | /Vvs. $Ag^+/Ag$ | |
| $TEABF_4$ | 3.4 | 3.4 | 6.8 |
| $EMIBF_4$ | 2.6 | 2.2 | 4.8 |
| $TMIBF_4$ | 2.6 | 1.8 | 4.4 |
| $AMNBF_4$ | 2.5 | 1.7 | 4.2 |
| $TMILBF_4$ | 2.3 | 1.5 | 3.8 |

(GC, 1 $mA/cm^2$, 10 mV/s)

Each electrolyte 8 includes tetrafluoroborate as anion 10, but it is clear that the obtained oxidation potential depends upon cation 9 combined with anion 10. This means that the oxidation potential of electrolyte 8 is not decided by anion 10 only, but it receives strong influences of interaction between cation 9 and anion 10 existing in the electrolyte 8.

Similarly, it can be considered that the reduction potential of electrolyte 8 is not decided by cation 9 only, but it receives strong influences of the interaction between cation 9 and anion 10 existing in the electrolyte 8.

Accordingly, in a certain kind of electrolyte 8, if the interaction between cation 9 and anion 10 can be lessened, it is probably possible to increase either one or both of oxidation potential and reduction potential to expand the potential window. Also, whether or not a specific electrolyte 8 has such an effect can be determined by means of simulation mentioned later.

A molecular orbital calculation can be used for the simulation. A program code such as MOPAC93 (Fujitsu Co., Ltd.) or GAUSSIAN98 (Gaussian Inc.) can be used. The procedure will be described in the following by using the drawings.

Figure 4:
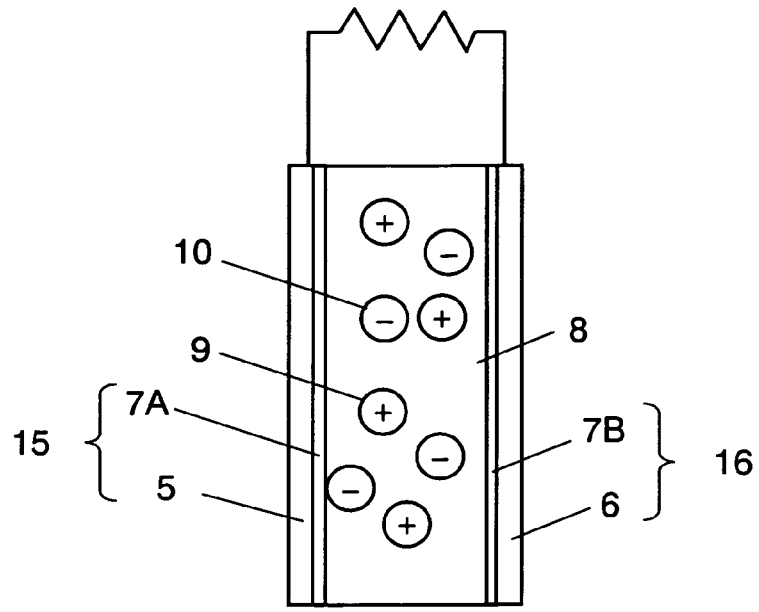
FIG. 4 is a model diagram of an essential portion of an electrical double layer capacitor in the preferred embodiment of the present invention.

FIG. 4 is a model diagram of a portion of element 2 shown in FIG. 3. As shown in FIG. 4, electrolyte 8 exists in between collector 5 and collector 6. Also, in FIG. 4, since no voltage is applied between collector 5 and collector 6, cation 9 and anion 10 exist in electrolyte 8 in a state of being dispersed.

Figure 5:
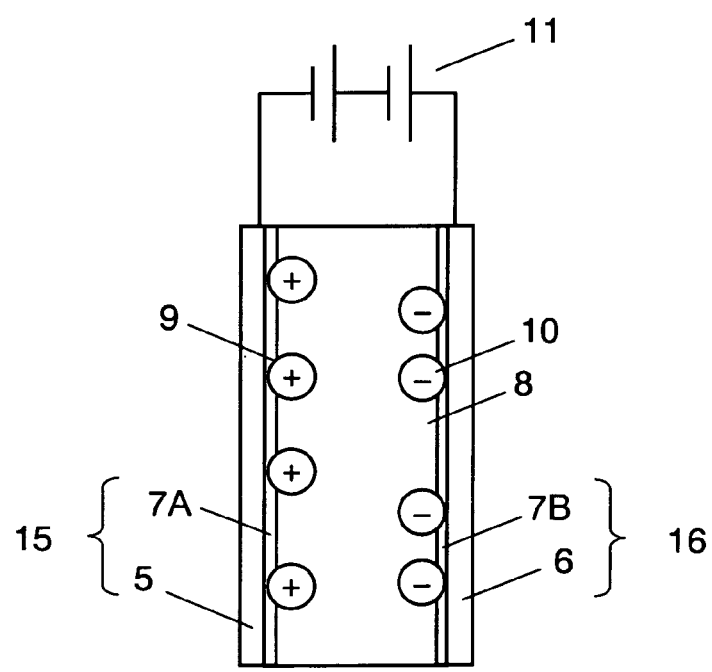
FIG. 5 is a model diagram of an essential portion of an electrical double layer capacitor in the preferred embodiment of the present invention.

FIG. 5 shows a state of power source 11 connected between collector 5 and collector 6. A minus electrode of power source 11 is connected to collector 5, and a plus electrode of power source 11 is connected to collector 6, respectively. With power source 11 connected, cation 9 is attracted to a surface of active carbon 7A due to a negative charge of the surface of active carbon 7A. Also, contrarily, anion 10 is attracted to a surface of active carbon 7B due to the positive charge of the surface of active carbon 7B. As a result, energy is accumulated in electrical double layer capacitor 20.

When a potential difference of more than a specific value $V_R$ is applied between cation 9 and the negative charge, electron moves from the surface of active carbon 7A to electrolyte 8. Also, when a potential difference of more than a specific value $V_O$ is applied between anion 10 and the positive charge, electron moves from electrolyte 8 to the surface of active carbon 7B. The withstand voltage in electrical double layer capacitor 20 means $V_W(=V_R+V_O)$ where $V_R$ is added to $V_O$, that is the size of potential window.

In the case of using the conventional electrode having no molecular sieve, not only one of cation 9 and anion 10 but also both of them may approach the electrode surface. So, $V_R$ and $V_O$ are decided not only by just cation 9 and anion 10 but also receiving the influences of interaction between cation 9 and anion 10. And, by the simulation based on the procedure shown in FIG. 6, the oxidation potential and reduction potential of electrolyte 8 are evaluated, and it is easily determined whether or not the oxidation potential and reduction potential can be increased. The determining procedure is explained in the following by using FIG. 6.

First, in step S71, electrolyte 8 is selected. Specifically, electrolyte 8 is supposedly formed of cation 9, anion 10, and solvent 12, as shown in FIG. 7. Also, FIG. 7 supposes that cation 9 is tetra-ethyl-ammonium, anion 10 is tetrafluoroborate, and solvent 12 is propylene carbonate. However, FIG. 7 is an example of electrolyte 8, and the configuration varies with electrolyte 8 selected.

Next, in step S72A, a model in which cation 9 and anion 10 are dissolved in solvent 12 is supposed. In step S72A, it is supposed that cation 9 and anion 10 form associated complex 14. And, it is supposed that associated complex 14 forms a dimer consisting of one cation 9 and one anion 10. A model in which the solute such as cation 9, anion 10, and associated complex 14 is dissolved in solvent 12 can be supposed by approximating solvent 12 as a polarizable continuum and storing the solute inside the continuum. However, the dissolution model of solute is not limited to this.

Next, in step S73A, energy of associated complex 14 is calculated by simulation when associated complex 14 formed by cation 9 and anion 10 is in a stable state. The calculated energy is called the first energy, and defined as the first value.

The energy calculated here is the total energy of electron and atomic nucleus contained in the associated complex. The energies of electron and atomic nucleus include kinetic energy of electron, potential energy between electron and atomic nucleus, potential energy between atomic nucleus and atomic nucleus, and zero point vibrational energy of atomic nucleus. Further, thermal vibrational energy at limited temperature is sometimes added.

Next, in step S74A, energies when associated complex 14 in a state of step S73A is reduced or when associated complex 14 in a state of step S73A is oxidized is calculated by simulation. The calculated energies are called as the second energy and the third energy respectively, and defined as the second value and the third value.

Here, when associated complex 14 is reduced, it means that electron has moved from active carbon 7A toward associated complex 14 existing near the surface of active carbon 7A. Also, when associated complex 14 is oxidized, it means that electron has moved from associated complex 14 existing near the surface of active carbon 7B toward active carbon 7B.

That is, as associated complex 14 is reduced or oxidized, negative charge or positive charge stored in negative electrode 15 or positive electrode 16 moves into electrolyte 8. As a result, the energy stored in electrical double layer capacitor 20 is lost. Simultaneously, cation 9 and anion 10 forming associated complex 14 becomes nearly radical. And, cation 9 and anion 10 are liable to perform chemical reaction, and electrolyte 8 becomes liable to break down.

Next, in step S75A, the fourth value is obtained by subtracting the second value from the first value, and also, the fifth value is obtained by subtracting the first value from the third value. Here, the fourth value means the gain of energy when associated complex 14 is reduced at the collector 5 side. And, the fifth value means the loss of energy when associated complex 14 is oxidized at the collector 6 side.

That is, it means that there is a possibility that the smaller the fourth value, the reduction potential becomes greater.

And, it means that there is a possibility that the greater the fifth value, the oxidation potential becomes greater. Further, the sixth value is obtained by subtracting the fourth value from the fifth value. It means that there is a possibility that the greater the sixth value, it means that there is a possibility that the potential window becomes greater.

On the other hand, in step S72B, a model in which cation 9 or anion 10 is individually dissolved in solvent 12 is supposed. In step S72B, it is supposed that cation 9 or anion 10 does not form associated complex 14 but it exists individually.

Next, in step S73B, energy is calculated by simulation when cation 9 is individually in a stable state. The calculated energy is called the first C energy, and defined as the first C value. Similarly, energy is calculated by simulation when anion 10 is individually in a stable state. The calculated energy is called the first A energy, and defined as the first A value.

Next, in step S74B, respective energies are calculated when cation 9 is reduced and when anion 10 is oxidized from the state of S73B. The calculated energies are respectively called the second C energy and the third A energy, and defined as the second C value and the third A value.

Here, when cation 9 is reduced, it means that electron has moved from active carbon 7A toward cation 9 existing near the surface of active carbon 7A. Also, when anion 10 is oxidized, it means that electron has moved from anion 10 existing near the surface of active carbon 7B toward active carbon 7B.

That is, as cation 9 is reduced or anion 10 is oxidized, negative charge or positive charge stored in negative electrode 15 or positive electrode 16 moves into electrolyte 8. As a result, energy stored in electrical double layer capacitor 20 is discharged. Simultaneously, each of cation 9 and anion 10 becomes radical. And, cation 9 and anion 10 are liable to perform chemical reaction, and electrolyte 8 becomes liable to break down.

Next, in step S75B, the fourth C value is obtained by subtracting the second C value from the first C value, and also, the fifth A value is obtained by subtracting the first A value from the third A value. The fourth C value means the gain of energy when cation 9 is reduced at the collector 5 side. And, the fifth A value means the loss of energy when anion 10 is oxidized at the collector 6 side.

That is, the smaller the fourth C value, there is a possibility that the reduction potential becomes greater, and the larger the fifth A value, there is a possibility that the oxidation potential becomes greater.

Further, in step S76, the fifth value is compared with the fifth A value. As a result of comparison, when the fifth A value is larger, anion 10 does not form associated complex 14 in combination with cation 9, and it is determined that the oxidation potential becomes increased when the interaction between ions is lessened. And, as a method of lessening the interaction between ions, a first molecular sieve is formed at the positive electrode 16 side. Also, the fourth value is compared with the fourth C value. As a result of comparison, when the fourth value is larger, cation 9 does not form associated complex 14 in combination with anion 10, and it is determined that the reduction potential becomes increased when the interaction between ions is lessened. As a method of lessening the interaction between ions, a second molecular sieve is formed at the negative electrode 15 side.

As to five kinds of electrolyte shown in Table 1, it is attempted to specifically apply the procedure in the following.

Figure 6:
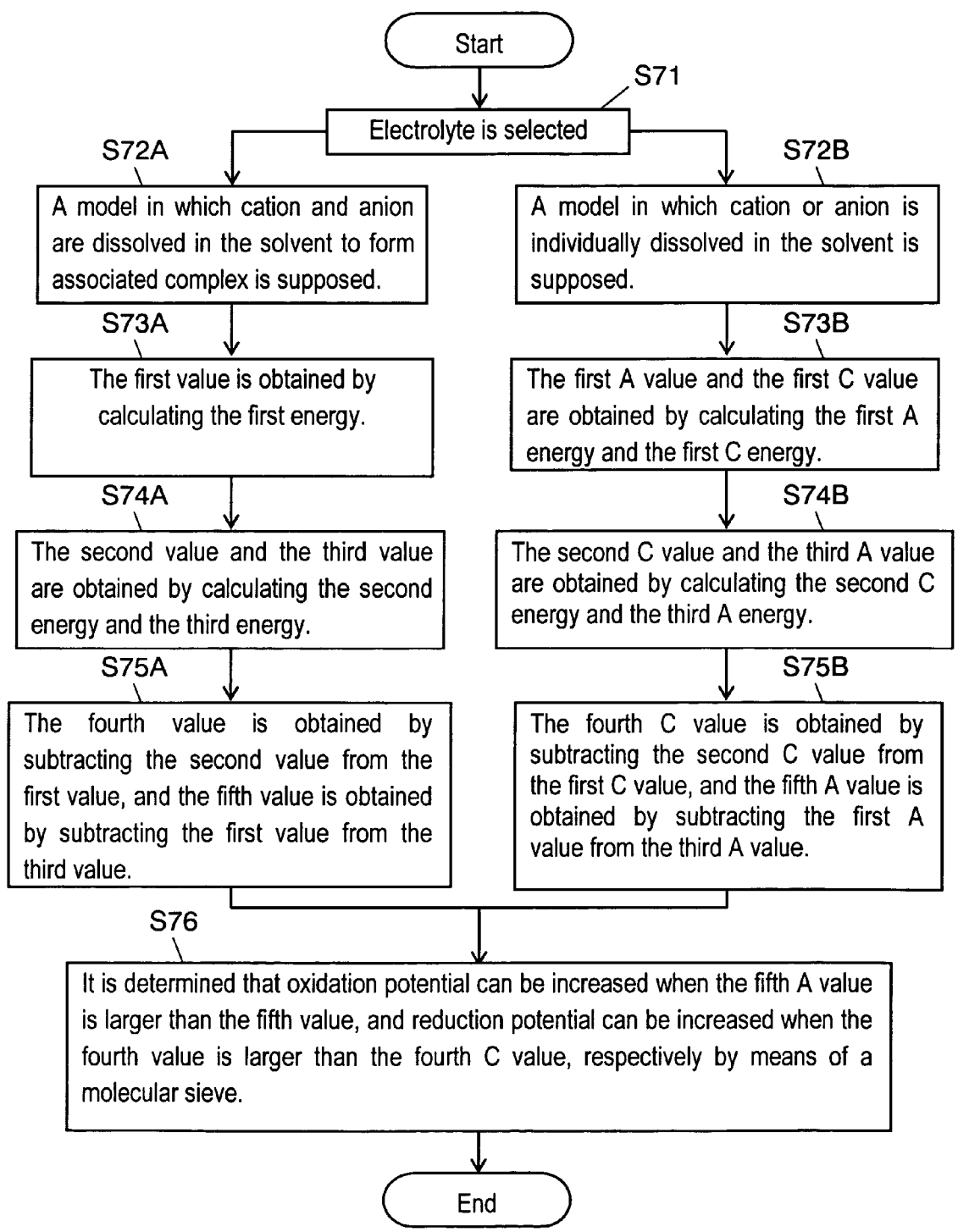
FIG. 6 is a flow chart showing a manufacturing method for an electrical double layer capacitor in the preferred embodiment of the present invention.

In the procedure of FIG. 6, HF/3-21+G (Hartree-Fock method, 3-21+G basic function), IPCM (Isodensity Polarizable Continuum Model: J, B. Foresmanetal., Phys. Chem. 100, 16098 (1996).) is applied to obtain the fifth value and the fourth value. The sixth value is obtained by subtracting the obtained fourth value from the obtained fifth value. With the sixth value as the predicted calculated value of potential window, FIG. 9 shows the result of comparison with actual measured value Ew of potential window by cyclic voltammetry shown in Table 1.

Figure 9:
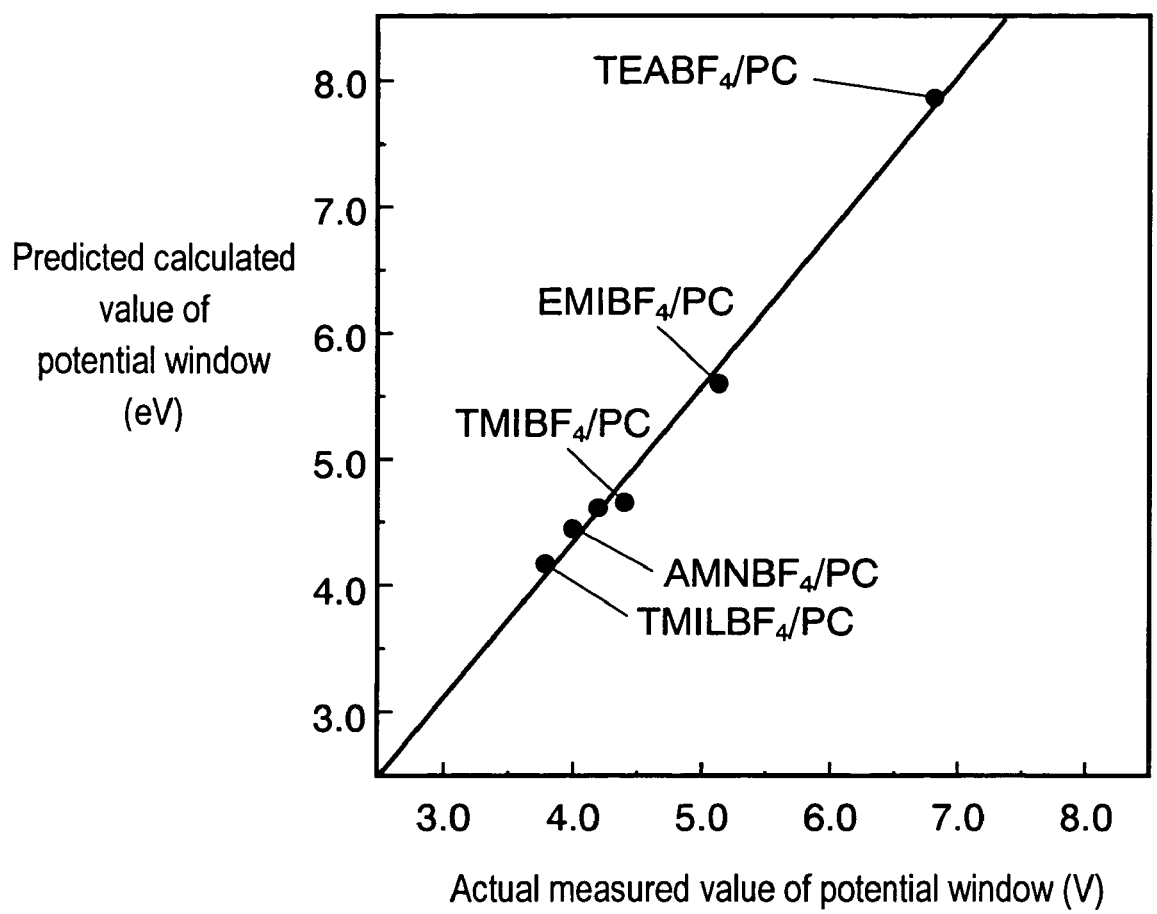
FIG. 9 is a characteristic diagram showing a value of potential window of an electrolyte used for an electrical double layer capacitor in the preferred embodiment of the present invention.

In FIG. 9, the predicted calculated value and actual measured value Ew are in good correlation with each other. Therefore, it is clear that the reduction potential, oxidation potential, and potential window have been decided under the influence of interaction between cation 9 and anion 10. Further, it is obvious that the prediction of reduction potential, oxidation potential, and potential window according to the procedure of FIG. 6 is right and correct.

Also, the result of comparison between the fifth value and the fifth A value is shown in Table 2.

TABLE 2

Comparison of the fifth value and the fifth A value

| Chemical species | Fifth value /eV | Fifth A value |
|---|---|---|
| $BF_4^-$ | | 8.133 |
| $TEABF_4$ | 8.221 | |
| $EMIBF_4$ | 6.173 | |
| $TMIBF_4$ | 6.085 | |
| $AMNBF_4$ | 5.910 | |
| $TMILBF_4$ | 5.721 | |

(HF/3 − 21 + G, IPCM, $e_r$ = 69.0)

In Table 2, the fifth A value is larger than the fifth value except for electrolyte 8 including tetra-ethyl-ammonium ($TEA^+$) as cation 9. Therefore, anion 10 does not form associated complex 14 in combination with cation 9, and it can be determined that the oxidation potential becomes increased when the interaction between ions is lessened. In this case, there is a possibility that the oxidation potential is increased by about 2 V that is the difference between the fifth A value and the fifth value.

As cation 9, when electrolyte 8 including 1-ethyl-3-methyl-imidazolium ($EMI^+$), 1,2,3-trimethl-imidazolium ($TMI^+$), 5-aza-1-azonia-5-methyl-bicyclo-[4,3,0]-nonane ($AMN^+$), 1,2,3,4-tetramethyl-imidazolium ($TMIL^+$) is used, positive electrode 16 of electrical double layer capacitor 20 is provided with first molecular sieve having a molecular sieving function. As a result, only tetrafluoroborate ($BF4^-$) is adsorbed onto the surface of positive electrode 16, and it is unable to adsorb cation 9. Consequently, anion 10 does not form associated complex 14 in combination with cation 9, thereby increasing the oxidation potential.

For example, as shown in FIG. 10, it is preferable to select the one whose average pore radius (Rxb) of pores 19B formed in active carbon 7B used for positive electrode 16 is larger than the ion radius (Ra) of anion 10 and smaller than the ion radius (Rc) of cation 9 (Ra<Rxb<Rc). Then, only anion 10 gets into pores 19B and is adsorbed onto porous surfaces of active carbon 7B. Cation 9 is unable to pass through pores 19B, which is therefore not adsorbed onto the porous surfaces of active carbon 7B. That is, pore 19B of active carbon 7B serves as the first molecular sieve which prevents cation 9 from sticking to the surfaces of positive electrode 16, thereby displaying a molecular sieving function.

Also, the fourth value is compared with the fourth C value, and when the fourth value is larger, cation 9 does not form associated complex 14 in combination with anion 10, and it can be determined that the reduction potential becomes increased when the interaction between ions is lessened. In this case, there is a possibility that the reduction potential is increased for the potential difference between the fourth value and the fourth C value. And, negative electrode 15 of electrical double layer capacitor 20 is provided with a second molecular sieve having a molecular sieving function. As a result, only cation 9 is adsorbed onto the surface of negative electrode 15, and it is unable to adsorb anion 10. Consequently, cation 9 becomes unable to form associated complex 14 in combination with anion 10, thereby increasing the reduction potential.

For example, as shown in FIG. 11, it is preferable to select the one whose average pore radius (Rxa) of pores 19A formed in active carbon 7A used for negative electrode 15 is larger than the ion radius (Rc) of cation 9 and smaller than the ion radius (Ra) of anion 10 (Rc<Rxa<Ra). Then, only cation 9 gets into pores 19A and is adsorbed onto porous surfaces of active carbon 7A. Anion 10 is unable to pass through pores 19A, which is therefore not adsorbed onto the porous surfaces of active carbon 7A. That is, pore 19A of active carbon 7A serves as the second molecular sieve which prevents anion 10 from sticking to the surfaces of negative electrode 15, thereby displaying a molecular sieving function.

Also, the extension of ions is defined by using equal electron density phase (0.001 a.u.) obtained by 3−21+G basic function of Hartree-Fock method. As a result, the ion radius is defined by the radius of sphere having a volume equal to the ion volume obtained, and the result is shown in Table 3.

TABLE 3

| Chemical species | Ion radius/ angstrom |
|---|---|
| $BF_4^-$ | 4.738 |
| $TEABF_4$ | 8.221 |
| $EMIBF_4$ | 6.173 |
| $TMIBF_4$ | 6.085 |
| $AMNBF_4$ | 5.910 |
| $TMILBF_4$ | 5.721 |

(HF/3 − 31 − G)

In Table 2, due to the molecular sieving function of the first molecular sieve, out of electrolyte 8 that can be increased in oxidation potential, the reduction potential of 1-ethyl-3-methly-imidazolium ($EMI^+$) is greatest. Also, in Table 3, electrolyte 8 containing 1-ethyl-3-methyl-imidazolium ($EMI^+$) is preferable to be 6 angstrom or less in average pore radius of pores 19B for obtaining the function of the first molecular sieve. Accordingly, it is possible to make only tetrafluoroborate ($BF4^-$) that is anion 10 selectively get into pores 19B. Consequently, the oxidation potential becomes increased. That is, in the case of using electrolyte 8 containing tetrafluoroborate ($BF4^-$) as anion 10, the oxidation potential becomes increased when the average pore radius of pores 19B is 6 angstrom or less.

Figure 12:
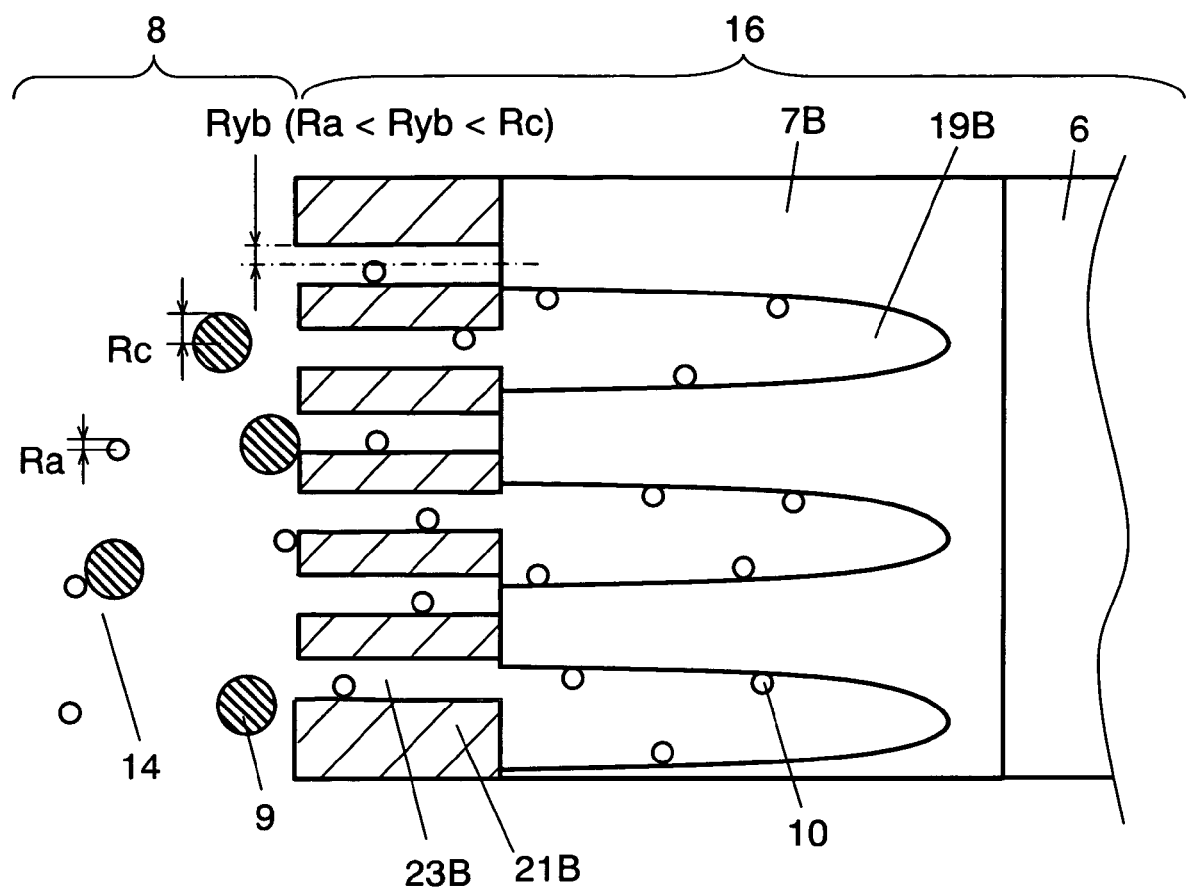
FIG. 12 is a schematic diagram of an electrical double layer capacitor in the preferred embodiment of the present invention.

Also, to realize the molecular sieving function, the molecular sieve is preferable to be formed on coat 21A or coat 21B coating the surface of negative electrode 15 or positive electrode 16. FIG. 12 is a schematic diagram showing the first molecular sieve formed on coat 21B coating the surface of positive electrode 16. Also, FIG. 13 is a schematic diagram showing the second molecular sieve formed on coat 21A coating the surface of negative electrode 15.

As shown in FIG. 12, it is preferable to select the one whose average pore radius (Ryb) of coat pores 23B (hereafter referred to as pores 23B) of coat 21B is larger than the ion radius (Ra) of anion 10 and smaller than the ion radius (Rc) of cation 9 (Ra<Ryb<Rc). Then, only anion 10 can be adsorbed onto the surface of active carbon 7B that is positive electrode 16. That is, cation 9 is unable to pass through pores 23B, and is not adsorbed onto the porous surfaces of active carbon 7B. Pore 23B serves as the first molecular sieve which prevents cation 9 from sticking to the surfaces of positive electrode 16, thereby displaying a molecular sieving function.

In this case, when electrolyte 8 containing 1-ethyl-3-methly-imidazolium ($EMI^+$) is 6 angstrom or less in average pore radius of pores 23B, it is possible to make only tetrafluoroborate ($BF4^-$) that is anion 10 selectively get adsorbed onto the surface of positive electrode 16. Consequently, the oxidation potential can be increased. That is, in the case of using electrolyte 8 containing tetrafluoroborate ($BF4^-$) as anion 10, the oxidation potential becomes increased when the average pore radius of pores 23B is 6 angstrom or less.

Figure 13:
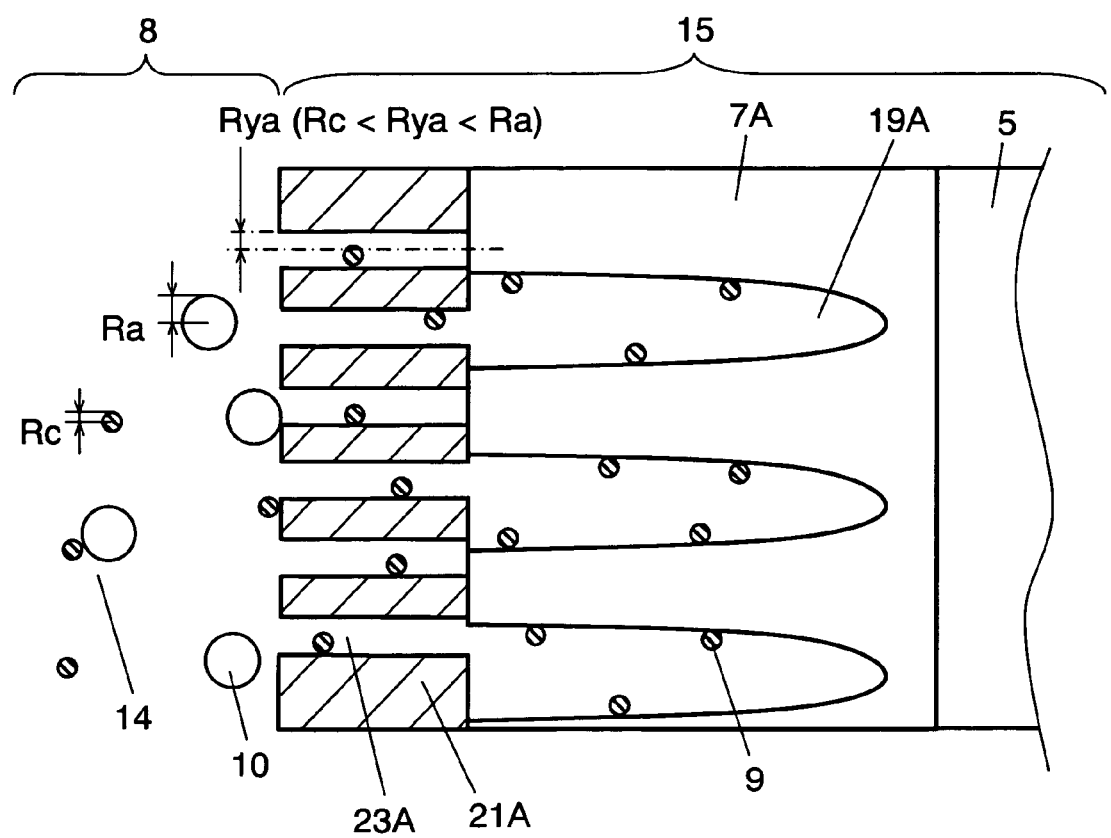
FIG. 13 is a schematic diagram of an electrical double layer capacitor in the preferred embodiment of the present invention.

Also, as shown in FIG. 13, it is preferable to select the one whose average pore radius (Rya) of coat pores 23A (hereafter referred to as pores 23A) of coat 21A is larger than the ion radius (Rc) of cation 9 and smaller than the ion radius (Ra) of anion 10 (Rc<Rya<Ra). Then, only cation 9 gets into pores 23A and is adsorbed onto the porous surfaces of active carbon 7A. Anion 10 is unable to pass through pores 23A, and is not adsorbed onto the porous surfaces of active carbon 7A. That is, pore 23A serves as the second molecular sieve which prevents anion 10 from sticking to the surfaces of negative electrode 15, thereby displaying a molecular sieving function.

As the material for coat 21A, 21B, for example, polymer and ceramics can be selected. However, the present invention is not limited to these. Coat 21A, 21B are just required to satisfy such conditions that coat 21A, 21B do not dissolve or disappear in electrolyte 8 and that they do not cause the characteristics of negative electrode 15, positive electrode 16, or electrolyte 8 to be changed. That is, all kinds of materials can be used for coat 21A, 21B provided that they are capable of realizing a molecular sieving function without dissolving and changing the characteristics.

Also, as for the step of obtaining radius (Rc) of cation 9 and the radius (Ra) of anion 10 as the radius of sphere having same volume as the volume in the range of electron density being 0.001 a.u. or less, it is preferable to combine the step before and after the procedure shown in FIG. 6. As a result, the average pore radius of pores 19A, 19B, 23A, 23B for realizing the first or the second molecular sieve can be easily defined. In this case, the step of forming active carbon 7A, 7B on negative electrode 15 or positive electrode 16 is combined with the procedure shown in FIG. 6, and thereby, electrical double layer capacitor 20 having a molecular sieve can be realized. Also, the step of forming coat 21A, 21B coating the surface of negative electrode 15 or positive electrode 16 is combined with the procedure shown in FIG. 6, and thereby, electrical double layer capacitor 20 having a molecular sieve can be realized.

Also, besides 1-ethyl-3-methyl-imidazolium ($EMI^+$), the average pore radius of the first molecular sieve is preferable to be 6 angstrom or less provided that cation 9 is 6 angstrom or over in ion radius. Accordingly, it becomes possible to make only tetrafluoroborate ($BF4^-$) that is anion 10 selectively get absorbed onto the surface of positive electrode 16.

As described above, since certain electrolyte 8 provides positive electrode 16 or negative electrode 15 with a molecular sieving function, either one or both of oxidation potential and reduction potential can be increased. Further, it is very effective to use a simulation method for determining whether or not the oxidation potential or reduction potential can be increased. The reason for this is that as in the conventional method it takes a considerable time and labor to actually make electrical double layer capacitor 20 provided with a molecular sieving function and repeat trials and errors in the experiment. As a result, the manufacture of electrical double layer capacitor 20 is unrealistic.

The procedure shown in FIG. 6 supposes that the system for interaction of cation 9 and anion 10 is a dimer of cation 9 and anion 10 shown in FIG. 7. However, the associated complex is not limited to a dimer. For example, instead of dimer, it is preferable to suppose a trimer formed of one cation 9 and two anions 10, or a trimer formed of two cations 9 and one anion 10. Further, it is preferable to suppose all kinds of possible associated complex.

And, the fourth value and the fifth value to the supposed associated complex are obtained, and the fifth A value to individual anion 10 and fourth C value to individual cation 9 are obtained. As a result of comparing the obtained fifth value and fifth A value, when the fifth A value is larger, anion 10 does not form associated complex 14 in combination with cation 9. And, it is determined that the oxidation potential becomes increased when the interaction between ions is lessened. Also, as a result of comparing the obtained fourth value and the fourth C value, when the fourth value is larger, cation 9 does not form associated complex 14 in combination with anion 10. And, it is preferable to determine that the reduction potential becomes increased when the interaction between ions is lessened. As a method of lessening the interaction between ions, it is preferable to provide a first or second molecular sieve.

As described above, with respect to electrolyte 8 included in electrical double layer capacitor 20, the interaction between ions is lessened to increase one or both of oxidation potential and reduction potential, thereby expanding the potential window. That is, the adsorption of cation 9 contained in electrolyte 8 onto the surface of positive electrode 16 of cation 9 is suppressed by the first molecular sieve. Also, the adsorption of anion 10 contained in electrolyte 8 onto the surface of negative electrode 15 of anion 10 is suppressed by the second molecular sieve. One or both of the molecular sieving function of the first and the second molecular sieve is provided to separate anion 10 from cation 9 in the vicinity of electrode surface. In this way, it is possible to provide electrical double layer capacitor 20 which may be provided high withstand voltage and long life.

Also, whether one or both of oxidation potential and reduction potential can be increased or not is determined by using a simulation method. Accordingly, it is possible to effectively manufacture electrical double layer capacitor 20 providing high withstand voltage without repeating innumerable trials and errors in the experiments.

Electrolyte 8 including any one of 1-ethyl-3-methyl-imidazolium ($EMI^+$), 1,2,3-trimethyl-imidazolium ($TMI^+$), 5-aza-1-azonia-5-methyl-bicyclo[4,3,0]-nonane ($AMN^+$) and 1,2,3,4-tetra-methyl-imidazolium ($TMIL^+$), as cation 9, is generally called an amidine series electrolyte. And the amidine series electrolyte includes a cation presented with following chemical formula 1.

Chemical formula 1:

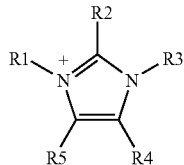

In the chemical formula 1; R1, R2, R3, R4 and R5 are independent hydrogen atoms or alkyl group having 1 to 10 carbons, respectively. R1, R2, R3, R4 and R5 may have the same thing, respectively. In addition, R1, R2, R3, R4 and R5 may have cyclic structure, when carbon atoms which are included in R1, R2, R3, R4 and R5 have connections between.

When the amidine series electrolyte is used for electrical double layer capacitor 20, the action and effect of the invention are obtained, as described above. However, it is not necessary that electrolyte 8 includes any one of 1-ethyl-3-methyl-imidazolium (EMI+), 1,2,3-trimethyl-imidazolium (TMI+), 5-aza-1-azonia-5-methyl-bicyclo[4,3,0]-nonane (AMN+) and 1,2,3,4-tetra-methyl-imidazolium (TMIL+), as cation 9. When electrolyte 8 of amidine series including cation 9 other than those four cations 9 is used for electrical double layer capacitor 20, a similar action and effect can be obtained.

INDUSTRIAL APPLICABILITY

The electrical double layer capacitor and its manufacturing method of the present invention shortens the period required for the development of electrolyte and enables the manufacture of high-performance electrical double layer capacitors effectively using high withstand voltage characteristics.

The invention claimed is:
1. An electrical double layer capacitor, comprising:
a case;
an electrolyte containing a cation and an anion, which is stored in the case;
a positive electrode and a negative electrode stored in the case; and
a first molecular sieve suppressing adsorption of the cation onto a surface of the positive electrode,
wherein the positive electrode includes active carbon having a pore, and
the first molecular sieve is the pore having an average pore radius that allows intrusion of the anion and suppresses intrusion of the cation.
2. The electrical double layer capacitor of claim 1,
wherein the average pore radius of the pores is larger than an ion radius of the anion and smaller than an ion radius of the cation.
3. The electrical double layer capacitor of claim 1,
wherein the electrolyte contains tetrafluoroborate, and the average pore radius is 6 angstrom or less.
4. The electrical double layer capacitor of claim 1,
wherein the electrolyte is an amidine series electrolyte which includes a cation presented with the following chemical formula,

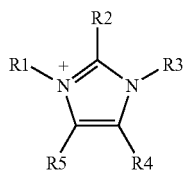

wherein R1, R2, R3, R4 and R5 are independent hydrogen atoms or alkyl group having 1 to 10 carbons, respectively.
5. The electrical double layer capacitor of claim 1,
wherein the cation contains at least one of 1-ethyl-3-methyl-imidazolium, 1,2,3-trimethyl-imidazolium, 5-aza-1-azonia-5-methyl-bicyclo[4,3,0]-nonane and 1,2,3,4-tetra-methyl-imidazolium.
6. An electrical double layer capacitor, comprising:
a case;
an electrolyte containing a cation and an anion, which is stored in the case;
a positive electrode and a negative electrode stored in the case; and
a first molecular sieve suppressing adsorption of the cation onto a surface of the positive electrode,
wherein the positive electrode includes a first coat which has a pore and coats the surface of the positive electrode, and
the first molecular sieve is the pore having an average pore radius that allows passing of the anion and suppresses passing of the cation.
7. The electrical double layer capacitor of claim 6,
wherein the average pore radius of the pores is larger than an ion radius of the anion and smaller than an ion radius of the cation.
8. The electrical double layer capacitor of claim 6,
wherein the electrolyte contains tetrafluoroborate, and the average pore radius is 6 angstrom or less.
9. The electrical double layer capacitor of claim 6,
wherein the electrolyte is an amidine series electrolyte which includes a cation presented with the following chemical formula, wherein R1, R2, R3, R4 and R5 are independent hydrogen atoms or alkyl group having 1 to 10 carbons, respectively.
10. The electrical double layer capacitor of claim 6,
wherein the cation contains at least one of 1-ethyl-3-methyl-imidazolium, 1,2,3-trimethyl-imidazolium, 5-aza-1-azonia-5-methyl-bicyclo[4,3,0]-nonane and 1,2,3,4-tetra-methyl-imidazolium.
11. An electrical double layer capacitor, comprising:
a case;
an electrolyte containing a cation and an anion, which is stored in the case;
a positive electrode and a negative electrode stored in the case; and
a second molecular sieve suppressing adsorption of the anion onto a surface of a negative electrode,
wherein the negative electrode includes an active carbon having a pore, and
the second molecular sieve is the pore having an average pore radius that allows intrusion of the cation and suppresses intrusion of the anion.

12. The electrical double layer capacitor of claim 11,
wherein the average pore radius of the pore is larger than an ion radius of the cation and smaller than an ion radius of the anion.

13. The electrical double layer capacitor of claim 11,
wherein the electrolyte contains tetrafluoroborate, and
the average pore radius is 6 angstrom or less.

14. The electrical double layer capacitor of claim 11,
wherein the electrolyte is an amidine series electrolyte which includes a cation presented with the following chemical formula,

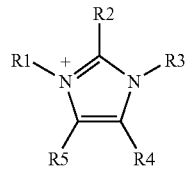

wherein R1, R2, R3, R4 and R5 are independent hydrogen atoms or alkyl group having 1 to 10 carbons, respectively.

15. The electrical double layer capacitor of claim 11,
wherein the cation contains at least one of 1-ethyl-3-methyl-imidazolium, 1,2,3-trimethyl-imidazolium, 5-aza-1-azonia-5-methyl-bicyclo[4,3,0]-nonane and 1,2,3,4-tetra-methyl-imidazolium.

16. An electrical double layer capacitor, comprising:
a case;
an electrolyte containing a cation and an anion, which is stored in the case;
a positive electrode and a negative electrode stored in the case; and
a second molecular sieve suppressing adsorption of the anion onto a surface of the negative electrode,
wherein the negative electrode includes a second coat which has a pore and coats the surface of the negative electrode, and
the second molecular sieve is the pore having an average pore radius that allows passing of the cation and suppresses passing of the anion.

17. The electrical double layer capacitor of claim 16,
wherein the average pore radius of the pore is larger than an ion radius of the cation and smaller than an ion radius of the anion.

18. The electrical double layer capacitor of claim 16,
wherein the electrolyte is an amidine series electrolyte which includes a cation presented with the following chemical formula,

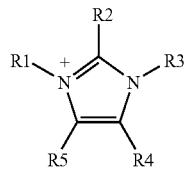

wherein R1, R2, R3, R4 and R5 are independent hydrogen atoms or alkyl group having 1 to 10 carbons, respectively.

19. The electrical double layer capacitor of claim 16,
wherein the cation contains at least one of 1-ethyl-3-methyl-imidazolium, 1,2,3-trimethyl-imidazolium, 5-aza-1-azonia-5-methyl-bicyclo[4,3,0]-nonane and 1,2,3,4-tetra-methyl-imidazolium.

20. The electrical double layer capacitor of claim 16,
wherein the electrolyte contains tetrafluoroborate, and
the average pore radius is 6 angstrom or less.

* * * * *